United States Patent [19]
Hedström

[11] Patent Number: 5,754,968
[45] Date of Patent: May 19, 1998

[54] METHOD AND ARRANGEMENT FOR FUEL QUANTITY ADJUSTMENT IN CONNECTION WITH DOWNSHIFT

[75] Inventor: Lars-Gunnar Hedström, Vagnhärad, Sweden

[73] Assignee: Scania CV Aktiebolag, Sodertalje, Sweden

[21] Appl. No.: 405,302

[22] Filed: Mar. 16, 1995

[30] Foreign Application Priority Data

Mar. 18, 1994 [SE] Sweden ................................. 9400900

[51] Int. Cl.$^6$ .......................... G06G 7/70; F16H 59/30
[52] U.S. Cl. ...................... 701/66; 701/51; 701/104; 477/121; 477/124; 477/135; 477/148; 74/336 R
[58] Field of Search ................... 364/424.1, 424.01, 364/424.08, 424.095, 431.051, 431.052, 431.053; 477/154, 155, 107, 122, 143, 148, 149, 125–127, 906, 78, 54, 85, 124, 135, 144; 74/336 R, 335, 339; 192/4 B, 3.31, 3.62, 13 A, 48.91, 53.1, 53.34, 12 A; 123/339, 357, 339.15, 358, 382

[56] References Cited

U.S. PATENT DOCUMENTS

| | | | |
|---|---|---|---|
| 4,378,673 | 4/1983 | Abo et al. | 364/431.02 |
| 4,616,615 | 10/1986 | Kawaguchi et al. | 123/339.15 |
| 4,619,234 | 10/1986 | Okamoto | 364/431.052 |
| 4,787,044 | 11/1988 | Nagata et al. | 364/431.07 |
| 4,800,859 | 1/1989 | Sagisaka | 123/497 |
| 4,905,544 | 3/1990 | Ganoung | 364/424.095 |
| 5,188,082 | 2/1993 | Udo et al. | 364/431.1 |
| 5,339,781 | 8/1994 | Osana | 123/357 |
| 5,406,919 | 4/1995 | Ikuta | 123/339 |
| 5,568,387 | 10/1996 | Anderson | 364/424.08 |

*Primary Examiner*—Jacques Louis-Jacques
*Attorney, Agent, or Firm*—Ostrolenk, Faber, Gerb & Soffen, LLP

[57] ABSTRACT

The invention relates to an improved method and arrangement for implementing that method, for obtaining in motor vehicles with mechanical stepped gearboxes with automatic gear changing a gentle and quiet engine adjustment during downshifts in normal operating situations and automatically in operating situations where a need for quicker downshifts requires quicker engine synchronisation. In normal operating situations, downshifts involve using only a limited fuel quantity, preferably corresponding to 20% of full-load fuel quantity, in order to raise the engine speed to the synchronous speed for the next gear, resulting in quieter engine adjustment without the occurrence of obvious disturbance of comfort, risk of losing downshifts or safety disadvantages. When there is a need for quicker gear changes, which is detected by any of the following conditions:

- accelerator pedal in kick-down position (82),
- accelerator pedal operated to more that 60% of full load, combined with activated hill climbing program (81),
- engine brake program activated (84), or
- too much vehicle deceleration during gear change (86), downshifts involve using a significantly larger fuel quantity (86), preferably corresponding to 50–100% of full-load fuel quantity, in order to raise the engine speed to the synchronous speed for the next gear.

15 Claims, 3 Drawing Sheets

METHOD AND ARRANGEMENT FOR FUEL QUANTITY ADJUSTMENT IN CONNECTION WITH DOWNSHIFT

The invention relates to a method and arrangement for computer assisted downshifting in motor vehicles.

BACKGROUND OF THE INVENTION

When motor vehicle gearboxes shift to lower gears which have higher gear ratios, the engine speed rises. In semi-automatic and fully automatic gear change systems, preferably for mechanically stepped gearboxes, the engine speed is then adjusted by adjusting the fuel quantity injected so as to increase the engine speed to a speed which is synchronous with the speed of the next gear.

One problem is that some downshifts require that the synchronous engine speed be reached very quickly so that the next gear can be engaged quickly, but other downshifts can tolerate significantly longer gear change times. The need for such rapid downshifts may arise on uphill runs where too protracted a torque break may cause the vehicle to lose too much speed during downshift from one gear to a suitably lower gear, which means that the gear change system has to respond quickly for downshifts involving one or two further steps. It is also desirable that when the driver has activated an engine brake program to achieve an increased engine brake effect, the activation of which may take place on long downhill runs with the object of sparing the ordinary wheel brakes, downshifts should not involve too protracted a torque break, since the engine brake effect is entirely nullified during such torque breaks.

In other operating situations, such as when driving on level roads, significantly longer torque breaks are tolerable in the course of downshifts without causing any disturbance in terms of safety or comfort.

Fully automatic or semi-automatic gear change systems for mechanical stepped gearboxes often employ a fixed engine control or the same fuel mobilization, with the same fuel mobilization derivative or the same fuel quantity boost, for all downshifts, whereby the established control routine becomes a compromise between rapid gear changes and gear changes with high comfort and minimum noise generation. Rapid downshifts are achieved if a very large fuel quantity corresponding to full-load mobilization or almost full-load mobilization is injected into the engine during the synchronization phase of the downshift.

Such full-load quantities cause unacceptable noise in normal operating situations, but they do ensure rapid gear changes.

In normal operating situations where there is no need for rapid downshifts, all that is required for downshifts to take place within reasonable times is fractions of the full-load quantities.

SUMMARY OF THE INVENTION

One object of the invention is to reduce, in automated gear changing in motor vehicles with mechanical stepped gearboxes, the engine noise which occurs in the course of the great majority of downshifts when the engine speed is adjusted upwards so as to reach a speed synchronous with the next gear, while only automatically achieving maximum gear change performance with shorter gear changing times (involving more engine noise, emissions and fuel consumption) in operating situations where rapid gear changes are required from the comfort point of view and for safe driving of the vehicle in traffic.

Another object is to activate such rapid downshifts automatically without any special control, switch or contacts having to be activated specifically for this rapid gear change function other than the control, switch or contacts which are already present at and around the vehicle driver's position and are used for controlling other functions.

A further object is to improve in particular a heavy freight vehicle's hill-climbing capability without risk of the vehicle losing a downshift and becoming stationary on uphill runs, while minimizing engine noise caused by all normal downshifts.

The foregoing and other objects are accomplished in accordance with the present invention by a computer assisted method for controlling downshift from a higher gear to a lower gear in a motor vehicle to increase the speed of the engine of the motor vehicle to a synchronized speed which is synchronized with the lower gear. In accordance with the invention, during downshifting from a higher gear to a lower gear, a plurality of vehicle and engine parameters which are indicative of whether a first time interval or a second time interval is needed for increasing the speed of the engine to the synchronized speed are sensed. Based upon the sensed parameters, either a first fuel quantity or second fuel quantity is supplied to the engine to increase the speed of the engine to the synchronized speed. The second fuel quantity is greater than the first fuel quantity so that the second time interval is shorter than the first time interval.

Other features distinguishing the invention are indicated by the description hereinafter of an embodiment with reference to the figures listed below.

DESCRIPTION OF THE PREFERRED EMBODIMENT

Figure 1:
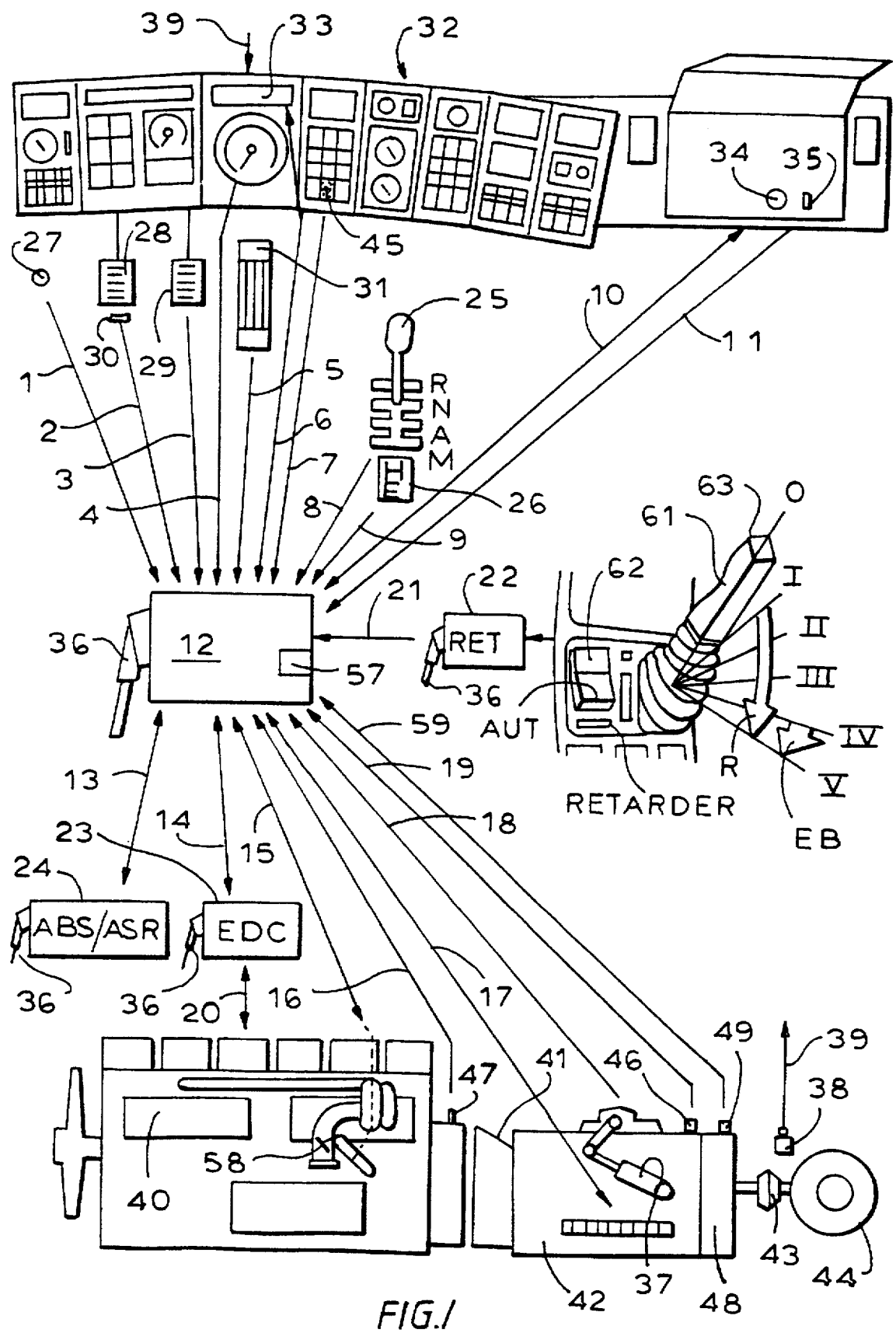
FIG. 1 depicts schematically the composition of a gear change system for mechanical stepped gearboxes.

FIG. 1 depicts a gear change system for monitoring and control of the computer-assisted operation of mechanical gearboxes in a motor vehicle. The vehicle is powered by a combustion engine 40, preferably a diesel engine, which via a clutch 41 operated by the driver can transmit driving power to the vehicle's driving wheels 44 via a mechanical stepped gearbox 42 and propeller shaft 43. The gear box 42 preferably incorporates an integrated retarder 48 with which an adjustable retarder braking effect can be exerted on the driveline with the object of achieving a high braking effect on the vehicle without using the vehicle's ordinary wheel brakes. The gear change system in this embodiment incorporates a manually operated clutch servo for starting and stopping, with no automatic clutch servo, but the invention may also be applied in systems with automated clutch.

The gear change system executes gear changes by adjusting the engine speed and the engine torque in the course of gear changes and by operating the servo which disengages the current gear and engages the next gear without disengaging the clutch 41. The result is high demands on the engine control arrangements and with regard to the speed information which the system requires for the engine control arrangements to facilitate the torque-free disengagement of a gear, and for quickly achieving, by means of the engine control arrangements only, the synchronous speed for the next gear, which has to be engaged with the shortest possible torque break in the mechanical stepped gearbox.

Mechanical stepped gearboxes, preferably with or without conventional synchronizing arrangements in the gearbox, are from many points of view a considerably more advantageous choice than conventional hydraulic automatic gearboxes which change gear without torque break or than mechanical gearboxes with complicated double clutches which have to provide gear chancing without torque break. This is particularly so from the cost point of view as regards operating economy, servicing and purchase cost. If the stepped gearbox also incorporates conventional synchronizations, the result is also increased operating safety in that manual gear changing or semi-automatic gear changing. i.e. servo-assisted disengagement and engagement of gears as a consequence of manual clutch disengagement, can be performed if the automated gear change function is eliminated by system failure, while maintaining a high degree of gear change comfort.

The gear change system incorporates a control unit 12 with microcomputer which is connected by various signal lines 36 to control units for the fuel system 23, the retarder system 22 and the vehicle brake system 24. These signal lines convey to the control unit 12 various signals corresponding to the signals 1–11, 13–19, 21 and 59 represented by arrows in FIG. 1.

The control unit 12 receives the following input signals:

Signal 1 from a brake program contact 27 which is situated accessibly for foot operation by the driver. The brake program contact acts on the retarder function via the control unit 22 but also on the gear change points of the gear change system when the brake program contact is activated.

Signal 2 from a clutch contact 30 which detects the position of the clutch pedal.

Signal 3 from the vehicle foot brake pedal, indicating the position of the brake pedal.

Signal 4 from the vehicle's tachometer, with secondary information on the vehicle's road speed or propeller shaft speed.

Signal 5 from the vehicle's accelerator pedal, indicating the current position of the accelerator pedal.

Signal 7 from an exhaust brake actuator 45 situated on an instrument panel 32.

Signal 8 from the gear lever, indicating the gear change system operating state chosen by the driver, either in automatic position A, neutral position N, manual position M or reversing R, and any corrections made by the driver to the automatically selected gear in automatic position A or to a new gear selection in any manual position N,M,R.

Signal 9 from a driving program selector 26 whereby the driver can select, for example, economy program E, which gives gear change points with optimum fuel economy and gentle gear changes, or hill program H whereby the gear change points are set so as to provide maximum tractive force and give rapidity of gear change priority over comfort and quietness.

Signal 11 from a diagnostic selector 35 by which a test program incorporated in the software of the control unit can be activated for servicing or fault location by means of fault signalling on the instrument panel information field 33.

Signal 21 from the retarder control unit 22 which modifies the gear change points whenever the signal from the retarder function is activated so as to provide increased engine brake effect and coolant flow.

Signal 19 from an speed sensor situated on the output shaft of the gearbox 42, preferably the propeller shaft 43.

Signal 18 from gear sensors in the gearbox 42 which indicate which gear is engaged.

Signal 16 from a speed sensor situated on the input shaft of the gearbox 42, preferably on the engine's crankshaft or flywheel.

Signal 59 from a temperature sensor 49 which detects the temperature of the cooling water leaving the retarder.

The control unit 12 adjusts various servos or lights up information fields on the instrument panel 32 by the following output signals:

Signal 6 is directed to an information field 33 on the instrument panel 32 which indicates to the driver the gear change system operating state (A,N,M,R), current gear, next gear, driving program (E,H) and any fault codes, warnings and other information.

Signal 17 is directed to various solenoids in the gearbox which activate servos for operating gear change carriers so that gears can be disengaged and engaged respectively.

Signal 15 is directed to the exhaust brake 58 situated in the engine's exhaust system so that the exhaust brake in addition to its function as a supplementary brake can be activated to reduce the engine speed quickly to synchronous speed, particularly when changing up to gears with lower gear ratios.

The control unit 12 is also in two-way communication in that it transmits output signals to and receives input signals from a number of control units via the following links:

Link 10 connected to the diagnostic socket 34 whereby diagnostic equipment can tap fault codes from the control unit 12 and carry out software testing of the functioning of the control unit.

Link 13 connected to the control unit for the antilocking function of the brakes (ABS) and antiskid function (ASR), whereby the brake control unit may inter alia prevent gear changes when the ASR function is active.

Link 14 connected to the fuel system control unit 23 which in its turn, via link 20, adjusts the fuel quantity at the injectors of the combustion engine.

In the system indicated above, gear changing in the A position of the gear lever takes place automatically according to the engine parameters detected, such as vehicle speed, engine load and speed, and the derivatives of one or more of the factors vehicle speed/accelerator position/engine speed, if the accelerator pedal is fully depressed (so-called kickdown) and if braking takes place. Gear changing is performed automatically so as to achieve optimum fuel consumption and performance.

The retarder control unit 22 incorporates a manual control 61 which is preferably situated on the instrument panel 32. This control may be placed in a number of positions O–V, whereby the initial position 0 causes the retarder 48 to be disconnected and the positions I, II, III, IV and V cause a progressive increase in the braking effect of the retarder. Position I can produce a braking torque of 500 Nm, position II of 1000 Nm, position III of 1500 Nm, position IV of 2000

Nm and position V the maximum retarder braking effect of approximately 3000 Nm. It is advantageous for this latter braking effect step V to incorporate also simultaneous activation of the vehicle's exhaust brake 58/EB, thereby further increasing the braking effect on the vehicle's driving wheels. Positions O–V are stable, so the lever remains in the respective position if the driver releases the lever. The retarder function, however, always ceases as soon as the driver operates the vehicle's accelerator pedal 31, but the braking effect of the retarder comes in automatically as soon as the accelerator pedal is released when the control is in any of the positions I–V.

The retarder function may also operate as a constant speed maintenance function depending on operation of the brake pedal or of a button 63 on the control 61. The retarder's braking effect is then adjusted automatically so as to endeavour to maintain the vehicle's speed by progressively increasing the braking effect if the vehicle's speed increases. The button 62 may be used to bring this constant speed maintenance function in automatically upon activation of the brake pedal 29 and to keep it activated until the next time the accelerator pedal is operated.

The invention is applied with advantage to automatic gear changing in mechanical stepped gearboxes in which gear changing takes place without disengaging the clutch 41.

Figure 2:
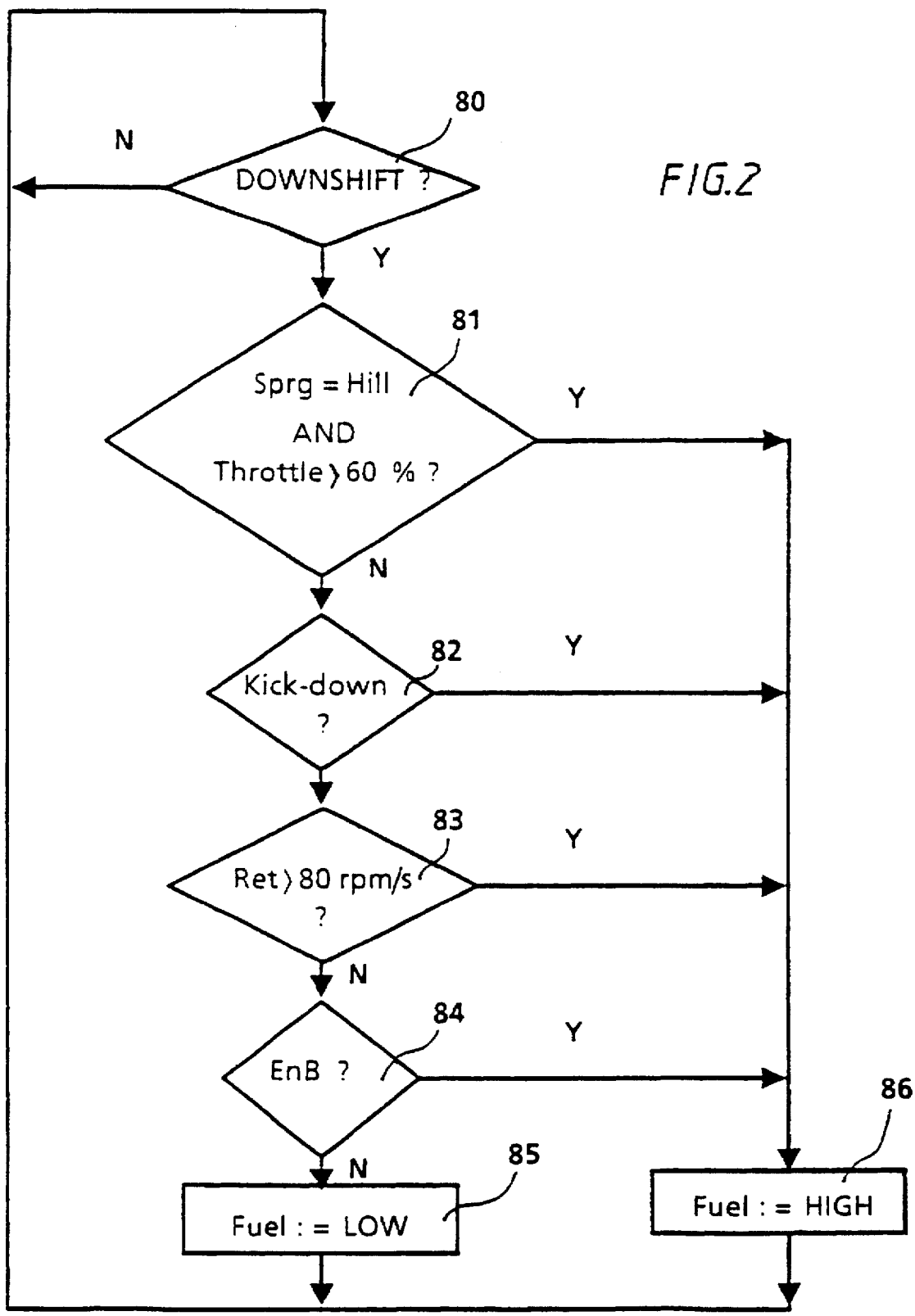
FIG. 2 shows a flow diagram of how the control unit detects the vehicle parameters which cause selective activation of a greater instantaneous fuel quantity boost during the synchronisation phase.

The invention is described in more detail with reference to FIG. 2, which depicts a schematic flow diagram for a control routine for automatic fuel quantity boost according to need during the synchronizing phase of a downshift. The control routine is stored in the microcomputer of the control unit 12.

A first interrogation step 80 checks whether a downshift is applicable. So long as no downshift is applicable, the program reverts to the main program. The control routine may preferably be accommodated in a program loop which is run through at a frequency of 100 Hz (hertz). Checking on whether a downshift is applicable thus takes place 100 times per second.

If a downshift is applicable, the control routine goes on to a second interrogation step 81 which detects whether a first condition for obtaining increased fuel quantity boost is fulfilled.

If the driver, via the driving program selector 26, has activated a driving program Sprg (shift program) for hill driving and has at the same time depressed the accelerator pedal 31 to a position corresponding to a gas mobilization exceeding 60% of full gas mobilization, this first condition is then fulfilled and the control routine goes on to step 86 and activates maximum fuel quantity boost during the synchronization phase of the downshift process. If the driving program selector is in the position for a hill driving program, this does not necessarily mean that there is a need for rapid gear changes. The second part of the first condition, the current throttle position, is used to ascertain whether rapid gear changes are required while the hill driving program is activated. It is advantageous for the throttle condition to be set substantially above part-load mobilization, and load mobilization corresponding to 60% of full mobilization may be advantageous. This limit condition may of course be modified by approximately 10% both upwards and downwards respectively if quicker gear changes are only required less frequently with significantly greater gas mobilization and more frequently with smaller gas mobilization.

If the first condition is not fulfilled at step 81, the control routine goes on to step 82 which detects whether a second condition for obtaining increased fuel quantity boost is fulfilled. If the driver has depressed the accelerator pedal right down to a so-called kick-down position, which is advantageously registered by separate limit switch contacts acted on by the accelerator pedal, this second condition is fulfilled and the control routine then goes on to step 86 and activates maximum fuel boost during the synchronization phase of the downshift process. When the driver depresses the accelerator pedal to the kick-down position, this is a clear indication that he desires a rapid response from the vehicle, which may for example be required by prevailing traffic conditions calling for maximum gas mobilization in order to escape from a risky traffic situation.

If this second condition at step 82 is likewise not fulfilled, the control routine goes on to step 83 which detects whether a third condition for obtaining increased fuel quantity boost is fulfilled. Step 83 monitors the vehicle's deceleration, advantageously by monitoring the propeller shaft speed. Deceleration is monitored during the course of downshifts and as soon as it exceeds a predetermined threshold value an indication is given that the road load, which is a combined effect of carriageway gradient, vehicle wind resistance/rolling resistance and vehicle load, is so great that quicker downshifts are required to avoid risk of losing downshifts. It is advantageous for the deceleration condition to be set at a propeller shaft speed deceleration of approximately 80 rpm/s, which in the case of a normal gear ratio in a heavy freight vehicle corresponds to a vehicle speed drop of approximately 5 km/h if gear changing takes one second.

Deceleration or speed drop is detected either as actual deceleration or as actual speed drop. It is advantageous for deceleration to be detected in a calculation routine which is incorporated in the program loop which is run through at a frequency of 100 Hz (hertz). A short timebase of 0.5 second is used, during which time the deceleration is determined. The deceleration is then updated 100 times per second and the retardation value is stored in the control unit memory, from which the value is derived at step 83 for determining whether the deceleration condition is fulfilled. The retardation value tends, however, to be greatly affected by variations in the vehicle driveline, resulting in an unsteady signal with alternating acceleration/deceleration value even if the tendency is deceleration. Alternatively the speed at the time for the beginning of upshift is stored in the control unit memory, and step 83 can then do a comparison with the current speed to determine whether the speed drop is greater than the predetermined threshold value.

One alternative to the deceleration condition at step 83 may be a gradient sensor which at carriageway gradients exceeding, for example, 5–8% activates increased fuel quantity boost. The gradient sensor is preferably of a type capable of distinguishing uphill runs from downhill runs so that increased fuel quantity boost is only activated by an uphill run gradient corresponding to the threshold value, thereby preventing the risk of losing a downshift on uphill runs.

If the third condition at step 83 is likewise not fulfilled, the control routine goes on to step 84 which detects whether a fourth condition for obtaining increased fuel quantity boost is fulfilled.

If an engine brake program has been activated, e.g. by the driver's acting on the brake program contact 27, there is automatic activation of the exhaust brake during the upshift process. The engine brake program results in the upshift points being raised and the exhaust brake being switched on as long as the contact 27 is depressed, but after the contact 27 has been released the upshift points only remain raised until the next time the accelerator pedal 31 is operated thereafter. The engine brake program may also affect upshifts so that at the time of upshift the exhaust brake is first deactivated, followed by rapid reactivation during the synchronization phase in order to reduce the engine speed to a speed synchronous with the next gear. When the engine brake program (EnB) has been activated and the vehicle parameters detect raised upshift points, the control routine goes on to step 86 and activates maximum fuel quantity boost during the synchronization phase of the downshift process.

Activated engine brake program indicates that the driver requires an extra-large brake effect and that the whole torque break and the consequent loss of engine brake effect which are caused by the downshift have to be kept as short as possible.

If the condition at the fourth step 84 is likewise not fulfilled, the control routine goes on finally to step 85 which activates a normal lower fuel quantity boost during the synchronization phase of the downshift process.

The control routine 80–85/86 is run through continuously during the downshift process, and if for example the vehicle's deceleration during the initial stage of the downshift does not exceed the predetermined threshold value, a subsequent exceeding thereof may result in maximum fuel quantity boost being activated during the synchronization phase of the downshift process if this synchronization phase has not been completed for the downshift concerned.

It is advantageous for activation of increased fuel quantity boost to take place as a hysteresis function whereby deactivation of an already increased fuel quantity boost does not take place until, for example, the deceleration is below the threshold value at step 83, or the throttle position is below the threshold value at step 81, to the extent of a predetermined offset value. Alternatively a function during the downshift process may stop the deactivation of an already activated increased fuel quantity boost because downward threshold values have been passed during the downshift process concerned.

It is advantageous for the aforesaid threshold value for the deceleration condition at step 83 to be adapted to the response of the gear change system. Quicker responses by the servos for gear disengagement, gear engagement, exhaust brake activation and fuel adjustment mean that the threshold value can be set at higher decelerations without the torque break due to gear changing becoming too long and thereby creating risk of a downshift being missed or of the engine brake effect ceasing for too long a time.

It is also possible to adapt the threshold value at step 81 by setting a higher limit value for the throttle condition in order to further reduce the use of increased fuel quantity boost and the resulting unavoidable noise generated in downshifts, or by setting a lower limit value for the throttle condition, in order to achieve quicker gear changes more often when a hill program has been activated. Further logical conditions may also be incorporated for the same purpose.

The predetermined threshold values are stored in a non-volatile memory 57 in the control unit 12.

Figure 3:
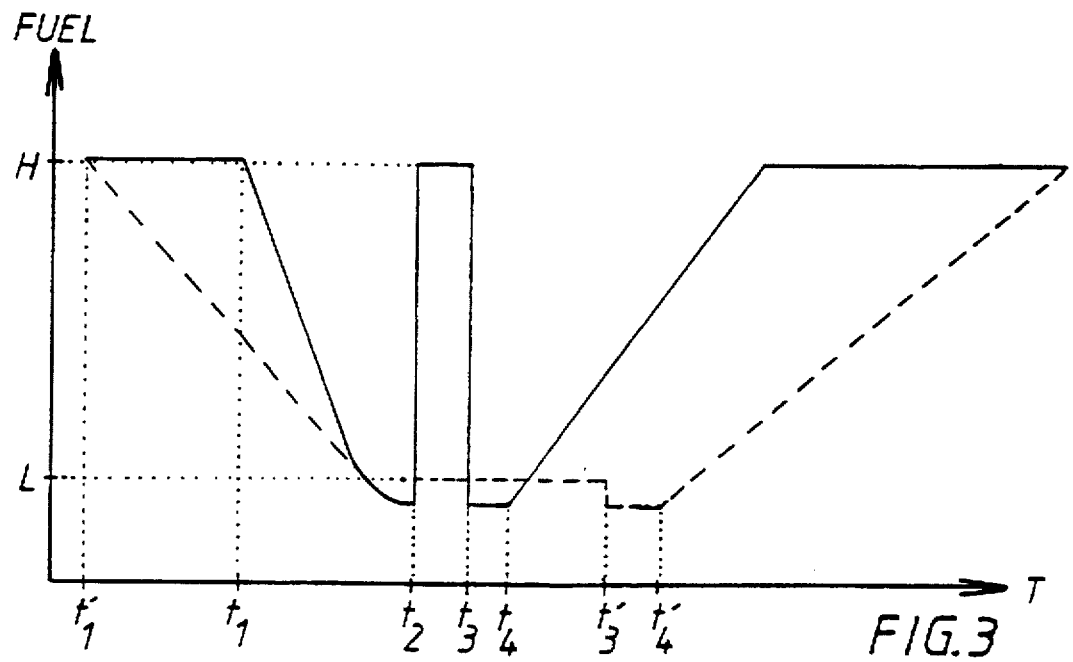
FIG. 3 shows a fuel quantity adjustment taking place during the course of a downshift.

FIG. 3 shows an example of two alternative fuel quantity adjustments carried out during a downshift process, involving an increased fuel quantity boost H effected during the synchronization phase as a fixed quantity step increased on the basis of vehicle parameters detected or a normal lower fuel quantity boost L during the synchronization phase of the downshift if there is no need for rapid gear changing.

FIG. 3 shows two alternative fuel quantity boosts. A first fuel quantity boost L depicted as a broken line is effected in normal circumstances such as indicated above at step 85. Just before time $t_1'$, an order is given for a downshift, which may take place as a consequence of the downshift point for the currently engaged gear having been passed. At time $t_1'$ the driver may have the accelerator pedal fully depressed and the fuel system injecting the maximum fuel quantity into each cylinder. With an 11-liter supercharged six-cylinder diesel engine this full-load quantity may be approximately 180 mg of diesel fuel per injection shot. At time $t_1'$ the downshift is commenced by the engine control overriding the accelerator pedal position so that the engine torque is reduced despite the accelerator pedal being held down, so that an almost torque-free state prevails in the gearbox gear combination, which is a prerequisite for being able to disengage the previous gear in the mechanical gearbox without problems. At time $t_2$ the required torque-free state is reached and the previous gear disengages. The control system then orders a fuel quantity boost L which accelerates the engine to a higher speed.

The normal fuel quantity boost L may be a fraction of the full-load quantities, and in the case of the abovementioned 11-liter engine the fuel quantity may preferably be approximately 35 mg of diesel fuel per injection shot. Synchronous speed is reached at time $t_3'$, after which speed adjustment to synchronous speed takes place, followed by engagement of the next gear, which is fully engaged at time $t_4'$, after which the fuel quantity injected is increased until it finally reaches the fuel quantity corresponding to the current accelerator pedal position. In contrast, if a need for rapid gear changing is detected, a second fuel quantity boost H, depicted as a continuous curve, takes place automatically as indicated above at step 86 on the basis of the conditions at steps 81–84.

Just before time $t_1$ an order is given for a downshift, which may take place in consequence of the driver having depressed the accelerator pedal to the kick-down position. At time $t_1$ the driver may have the accelerator pedal fully depressed and the downshift being commenced by the engine control overriding the accelerator pedal position so that the engine torque is reduced. At time $t_2$ the required torque-free state is reached and the previous gear disengages. The control system thereafter orders a higher fuel quantity boost H which accelerates the engine to a higher speed. This higher fuel quantity boost is initiated at time $t_2$ and may substantially correspond to the full-load quantity, and with the abovementioned 11-liter engine the fuel quantity may therefore preferably be approximately 180 mg of diesel fuel per injection shot. Synchronous speed is reached at time $t_3$ and a fuel quantity reduction takes place thereafter so that speed adjustment to synchronous speed can be achieved, followed by engagement of the next gear, which is fully engaged at time $t_4$, after which the fuel quantity injected is increased until it finally reaches the fuel quantity corresponding to the current accelerator pedal position.

The fuel quantity reduction from time $t_1'$ in the case of normal downshifts and time $t_1$ in the case of rapid gear changes takes place as depicted in FIG. 3 at different rates so that rapid gear changes involve quicker fuel reduction, i.e. a higher negative fuel derivative (dFuel/dt). Correspondingly, fuel increase for rapid downshifts from time $t_4$ involves quicker fuel mobilisation than the increase from time $t_4'$ in normal downshifts.

Figure 4:
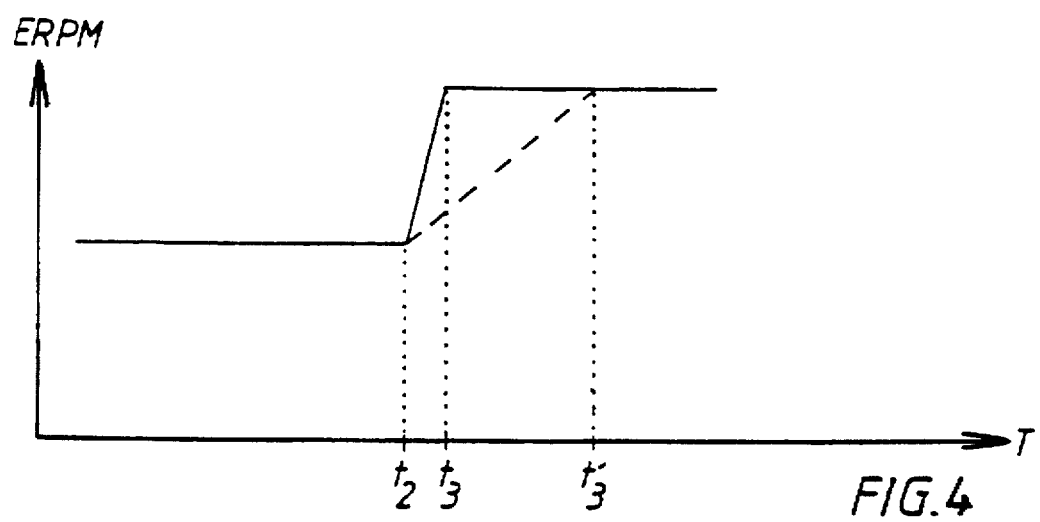
FIG. 4 shows the engine speed during a downshift.

FIG. 4 shows the engine speed Erpm during a downshift at times $t_2$ and $t_3/t_3'$. The engine speed is in principle constant up to time $t_2$ when the previous gear disengages. This is followed by a speed increase by means of the fuel quantity boost H up to time $t_3$, or up to time $t_3'$ along the broken curve if a normal lower fuel quantity boost L is activated. At time $t_3/t_3'$ the synchronous speed for the next gear is reached and gear engagement commences.

The example depicted in FIG. 3 involves only two levels (H/L) of fuel quantity boost, viz. a lower fuel quantity boost L employed for downshifts when there is no need for rapid downshifts, and a higher fuel quantity boost H employed for downshifts when rapid downshifts are required. This means that the lower fuel quantity boost L can be adapted for minimum noise generation while maintaining reasonable downshift times, and the higher fuel quantity boost H can be adapted for quickest possible downshift.

The downshift times applicable to different downshift situations may preferably be monitored in order to some extent to adaptively correct the modulated fuel quantity boosts. At least the lower fuel quantity boost L may be adaptively corrected so that the gear change times obtained, or the actual synchronization phase only, are within predetermined time ranges. To prevent the downshift process becoming too protracted or to facilitate further reduction in engine noise during normal downshifts, the fuel quantity boost may thus be corrected if downshift times are outside a predetermined acceptable time range. Downshift times shorter than the lower limit of the time range indicate that it is possible to further reduce the modulated fuel quantity and the noise generated. Conversely, downshift times longer than the upper limit of the time range indicate that downshifts should be speeded up. The acceptable time range may for example be 0.8–1.5 seconds, which means that downshifts that take less than 0.8 seconds result in reduction of the lower fuel quantity boost L. Conversely, if downshifts take longer than 1.5 seconds, the lower fuel quantity boost L increases. It is advantageous that fuel quantity corrections involve the smallest possible number of fixed quantity steps, which does not necessarily mean that the gear change time after only one adjustment will be within the acceptable time range, thus resulting in slower and gentler adjustment.

A feature of the invention is that substantially higher fuel quantity boosts are obtained during the synchronization phase automatically in operating situations where rapid gear changes are required. In normal downshifts it is advantageous for a lower fuel quantity boost L to be activated within the range 15–30% of full-load quantity, preferably 20% of full-load quantity.

In the operating situations detected at steps 81–84, a substantially higher fuel quantity boost is activated which is at least 20% higher than the normal lower fuel quantity boost and is over 40% of full-load quantity. If only one fixed higher fuel quantity boost H is used, this fuel quantity amounts to at least 50–100% of full-load quantity and may be limited upwards by emission requirements and noise requirements, so that the quickest possible downshifts can be activated automatically in panic situations where kickdown is activated, and in order to provide maximum hill climbing capability when a hill program is activated.

In a more developed variant, a number of higher discrete fuel quantity boost levels may be employed, or fuel quantity boost levels which involve stepless continuous increases and are activated proportionally to the need for rapid gear changing.

For example, a lower and normally applied fuel quantity boost level may be approximately 20–30% of full-load quantity, and higher levels of 50/60/70/80 or 100% of full-load quantity are activated when the throttle position at step 81 is over 60/70/80/90 or 100% respectively of the full-load position or if the deceleration at step 83 is over 20/40/60/80 or 120 rpm/s respectively.

It is preferable, however, to activate always the maximum fuel boost quantity at step 82 or 84 when kick-down activation or activated engine brake respectively indicates that the operating situation is such as to require quickest possible downshift.

The invention may be modified within the scope of the patent claims so as to produce differences from the preferred embodiments. The unique point of the invention, however, is selective use of increased fuel quantity boost during the synchronisation phase of downshifts in gear change systems for mechanical gearboxes, which in creased boosting only takes place automatically on the basis of the exceeding of predetermined vehicle parameters, which exceeding indicates that short torque breaks and rapid gear changes are required either because of risk of losing a downshift or because the traffic situation calls for rapid gear changing or because the interruption of engine brake effect has to be reduced in cases where extra brake effect is ordered by the driver.

Increased fuel quantity boost may also be initiated by a control system whereby the engine can be speeded up at different rates depending on the need for rapid gear changing, regardless of whether the engine control system uses the engine acceleration as control parameter or the modulated engine torque (Nm) as primary control parameter, thereby indirectly resulting in increased fuel quantities. For example, an acceleration-controlled feedback control system controls engine acceleration so that in the course of normal downshifts the engine is accelerated to a synchronous speed with significantly lower fuel mobilization derivative (dF/dt, F=fuel) than in the case of rapid gear changes.

I claim:

1. A computer assisted method for controlling downshift from a higher gear to a lower gear in a motor vehicle to increase the speed of the engine of the motor vehicle to a synchronized speed which is synchronized with the lower gear, which method comprises the steps of:

(a) downshifting from a higher gear to a lower gear;

(b) sensing a plurality of vehicle and engine parameters which are indicative of whether a first time interval or a second time interval is needed for increasing the speed of the engine to the synchronized speed during step (a); and (c) based upon step (b), supplying one of a first fuel quantity and second fuel quantity to the engine during step (a), the first and second fuel quantities increasing the speed of the engine to the synchronized speed in the first and second time intervals, respectively, with the second fuel quantity being greater than the first fuel quantity so that the second time interval is shorter than the first time interval.

2. A method according to claim 1, wherein the motor vehicle includes a mechanical gear box with the higher and lower gears disposed therein.

3. A method according to claim 2, wherein the parameters include activation of an engine brake of the vehicle, kickdown of an accelerator pedal of the vehicle, whether the vehicle is in a preset hill climbing mode and the grade of a hill being climbed by the vehicle.

4. A method according to claim 3, wherein the second fuel quantity is supplied if the vehicle is in the hill climbing mode and an accelerator pedal of the vehicle has been operated to a position exceeding 60% of a position corresponding to the full fuel-load fuel position.

5. A method according to claim 3, which includes sensing a vehicle deceleration prior to step (a) and supplying the second fuel quantity if the vehicle deceleration is above a predetermined value.

6. A method according to claim 5, wherein the predetermined deceleration value corresponds to a deceleration of 80 rpm/second.

7. A method according to claim 3, wherein the second fuel amount is supplied if the vehicle is in the hill climbing mode and the grade of the hill is within the range of 5–8%.

8. A method according to claim 3, wherein the second fuel quantity is within the range of 50–100% of a full-load fuel quantity.

9. A method according to claim 3, wherein the first fuel quantity is within the range of 15–30% of a full-load fuel quantity.

10. A method according to claim 3, wherein the first fuel quantity is approximately 20% of a full-load fuel quantity.

11. A method according to claim 3, which includes adaptively adjusting the first fuel quantity so that the first time interval is within a predetermined time range.

12. A method in accordance with claim 11, wherein the first quantity is increased by a first quantity step if the first time interval exceeds the predetermined time range and is reduced by a second quantity step if the first time interval is below the predetermined time range.

13. A computer assisted method for controlling downshift from a higher gear to a lower gear disposed in a mechanical gear box in a motor vehicle to increase the speed of the engine of the motor vehicle to a synchronized speed which is synchronized with the lower gear, which method comprises the steps of:

(a) downshifting from a higher gear to a lower gear;

(b) sensing a plurality of vehicle and engine parameters which are indicative of whether a first time interval or a second time interval is needed for increasing the speed of the engine to the synchronized speed during step (a), the parameters including activation of an engine brake of the vehicle, kick-down of an accelerator pedal of the vehicle, whether the vehicle is in a preset hill climbing mode and the grade of a hill being climbed by the vehicle; and (c) based upon step (b), supplying one of a first fuel quantity and a second fuel quantity to the engine during step (a), the first and second fuel quantities increasing the speed of the engine to the synchronized speed in the first and second time intervals, respectively, with the second fuel quantity being greater than the first fuel quantity so that the second time interval is shorter than the first time interval, the first fuel quantity being lower than 40% of a full-load fuel quantity.

14. A method according to claim 13, wherein the second fuel quantity is more than 40% of the full-load fuel quantity and the first and second fuel quantities differ from one another by more than 20% of the full-load fuel quantity.

15. A computer assisted arrangement for controlling down shift from a higher gear to a lower gear in motor vehicle to increase the engine speed of the vehicle to a speed which is synchronized with the lower gear, which arrangement comprises;

(a) means for downshifting to a lower gear from a higher gear;

(b) means for detecting whether the vehicle is in a hill climbing mode;

(c) means for detecting whether an accelerator pedal of the vehicle has been depressed to a position exceeding 60% of a full-load position;

(d) means for detecting whether the accelerator pedal has been operated to a kick-down position;

(e) means for determining whether an engine brake has been activated;

(f) means for storing a predetermined threshold value for vehicle deceleration during downshifting;

(g) means for determining if vehicle deceleration during downshifting exceeds the predetermined threshold value;

(h) means responsive to means (b), means (c), means (d), means (e) and means (g) for supplying one of a first fuel quantity and a second fuel quantity to the engine during downshift from the higher to the lower gear in order to raise the engine speed to the synchronized speed, the second fuel quantity being higher than the first quantity to increase the engine speed more quickly, means (h) supplying the second fuel quantity if the vehicle deceleration exceeds the threshold value, the vehicle is in a hill climbing mode, the accelerator pedal has been depressed more than 60% of the corresponding full-load position, the exhaust brake has been activated or the accelerator pedal has been depressed to a kick-down position.

* * * * *